Aug. 8, 1939.                E. H. RUGG                2,169,111
                      SERVICE ENTRANCE CABLE CLAMP
                         Filed June 23, 1938
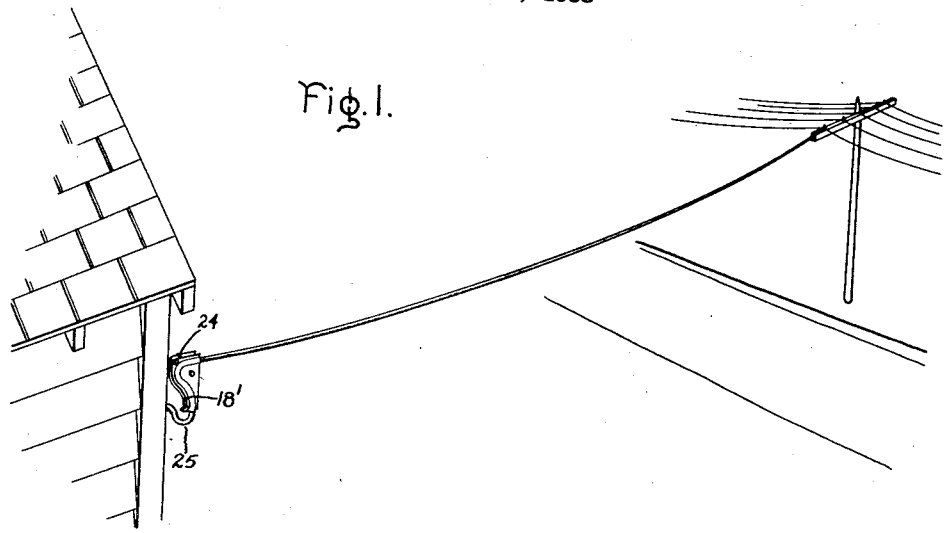
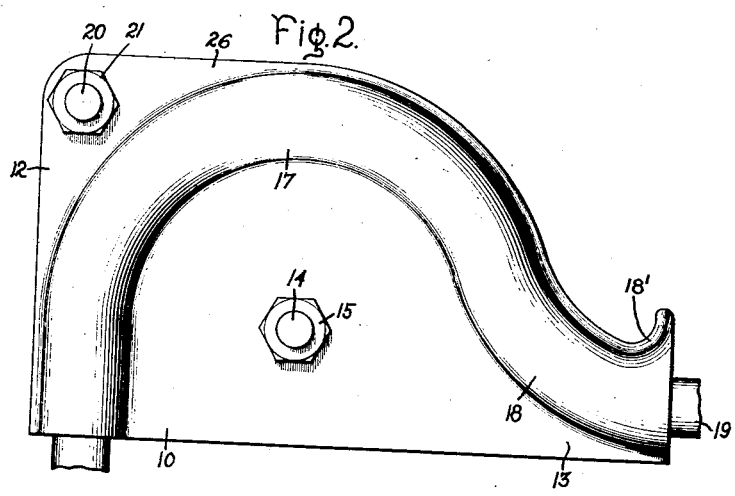
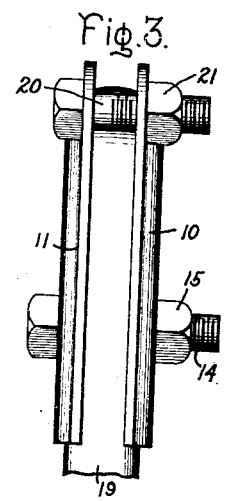
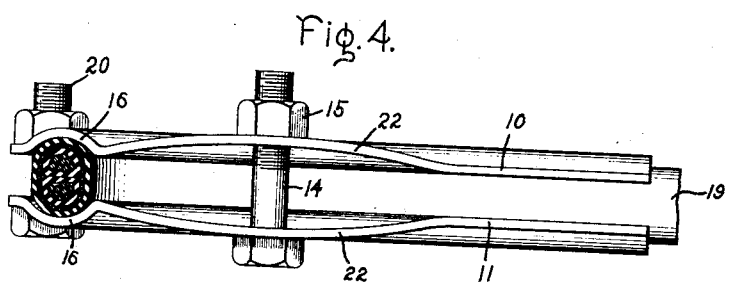
Inventor:
Edward H. Rugg,
by *Harry E. Dunham*
His Attorney.

Patented Aug. 8, 1939

2,169,111

UNITED STATES PATENT OFFICE 2,169,111

SERVICE ENTRANCE CABLE CLAMP

Edward H. Rugg, Bridgeport, Conn., asignor to General Electric Company, a corporation of New York Application June 23, 1938, Serial No. 215,418

3 Claims. (Cl. 24—125)

This invention relates to cable clamps, and more particularly to a cable clamp for service entrance cables.

It is an object of the invention to provide an improved construction and arrangement in cable clamps of the type described, which will clamp the cable securely without damage, and which may be manufactured at low cost.

In the accompanying drawing Fig. 1 shows a cable clamp in operative position supporting a service entrance cable upon a dwelling; Fig. 2 is an elevation of the cable clamp; Fig. 3 is an end view of the clamp; and Fig. 4 is a plan view of the cable clamp.

Referring to the drawing, the cable clamp comprises two complementary steel plates 10 and 11. In the form of the invention illustrated the plates are substantially rectangular in shape, as shown at 12, and are provided with extending portions shown at 13. A bolt 14 is disposed centrally transversely of the plates and is provided with a threaded end mounting a nut 15 to clamp the plates together for the purpose of gripping a cable. In order to provide a pocket for nesting of the cable and an ample clamping area, the plates are each provided with a groove 16. A portion 17 of the groove 16 is of substantially semi-circular form and curves about the bolt 14 as a center and a second portion 18 curves away reversely at one end in the extended portions of the clamping plates. The semi-circular portion 17 and the curved portion 18 together form a groove having the general shape of a goose neck. The reversely curved portion of the groove is provided with a flared end or bell 18'.

The two halves of the clamp comprising the clamping plates 10 and 11 are assembled about the service entrance cable 19 which is nested in the grooves 16. The cable is led into the semi-circular portion of the groove and extends around the perimeter of the groove and out the extended curved portion 18 in a direction at right angles to that at which it entered the groove. This construction is shown clearly by Fig. 2. A bolt 20 is passed through a corner of the rectangular portion of the clamp opposite to the extended portion and is used to support the cable clamp upon the wall of a dwelling or other support. A nut 21 retains the bolt in place. The portions of the clamping plates extending between the grooves 16 and the center clamping bolt 14 are curved outwardly as shown at 22 in Fig. 4, so that they are bowed away from each other. This construction, in addition to strengthening the plates, imparts a slight resiliency to them so that the plates are flexed slightly or compressed toward each other as the clamping bolt 14 and nut 15 are tightened to exert a clamping pressure upon the cable.

In the use of the device, the cable clamp is supported upon the wall of a dwelling or other support by means of a hook 24 which engages the supporting bolt 20. By removing either the bolt 14 or the bolt 20, the service entrance cable may be placed within the groove 16 between the clamping plates. Accordingly, it is unnecessary to thread the end of the cable through the clamp and it is possible to apply the clamp at any midpoint on the cable. The cable is then adjusted to proper position and the nut 15 tightened down upon the bolt 14 to lock the clamping plates together securely. In this position the cable extends outwardly to the service mains from the semi-circular portion of the groove and the cable extending from the reversely curved portion of the groove is formed with a drip loop 25 and led into the dwelling. It should be noted that the bolt 20 is substantially in axial alignment with the end of the semi-circular portion of the groove and is in direct alignment with the portion of the cable which extends outwardly to the service mains. By this construction the thrust of the weight of the cable is transmitted in a line directly to the bolt 20 and hook 24 without causing tipping or twisting of the cable clamp. In addition, should the cable and clamp sway in the wind the flared end or bell 18' will prevent the drip loop 25 from rubbing or chafing against the edge of the clamp so that no damage will be done to the covering of the cable.

By the construction described the cable clamp fits close to and parallel to the wall of the dwelling because the straight wall 26, forming an edge of the rectangular portion of the cable clamp, lies flush against the wall of the dwelling or other support, as shown in Fig. 1. In addition, the cable itself is clamped firmly between the two clamping plates because of the centrally arranged clamping bolt 14 which distributes the pressure equally about the length of the groove. The bowed portions 22 will flex slightly if the locking bolt is tightened excessively to prevent injury to the cable. Excessive clamping pressures are unnecessary by virtue of the goose neck form of the clamping groove. With this form of groove it is not necessary to exert a large clamping pressure upon the cable due to the fact that the cable is bent at right angles so that a firm grip is obtained between the clamp and the cable with little pressure on the cable. The radius of curvature of the groove is such that the cable is protected from damage due to sharp bends, and in the form of the invention illustrated, the cable may be easily bent to the contour of the groove. The groove 16 presents a smooth interior so that no injury to the outer insulation of the cable will take place should the cable slip or move within the clamp. The width of the groove is such that it will accommodate any of the sizes of commercial service entrance cable.

It will be apparent that the cable clamp herein described comprises relatively few parts which may be easily made from a single set of right and left-hand dies due to the fact that the complementary clamping plates 10 and 11 are of similar construction. The plates are held together by a single locking bolt and the assembled clamp is easily mounted on the wall of a dwelling, or other support, by means of a hook or other similar type of hanger. While the clamp has been described in connection with service entrance cables, it will be apparent that the clamp may be used with other types of cables and in other situations.

What I claim as new and desire to secure by Letters Patent of the United States is:

1. A cable clamp comprising complementary plates of generally rectangular form having extending portions and a bolt positioned centrally of said plates for clamping said plates together, each of said plates having a groove formed therein, portions of said grooves extending in a semi-circular curve around said bolt as a center and second portions of said groove extending in a reversely curved direction through the extending portions of said plates to form cable clamping surfaces of substantially goose neck form.

2. A cable clamp comprising complementary clamping plates and a bolt positioned substantially centrally of the area of said plates for clamping said plates together, each of said plates having a groove formed therein, portions of said grooves extending in a curved path around said bolt as a center, the area of each of said plates between said groove and said bolt being bowed outwardly away from each other to form a portion which is flexed upon tightening of said bolt.

3. A cable clamp comprising complementary clamping plates of generally rectangular form having extending portions, means positioned centrally of said plates for clamping said plates together, each of said plates having a groove formed therein, portions of said grooves extending in a semi-circular path around said clamping means as a center and second portions of said grooves extending in a reversely curved direction through the extending portions of said plates to form cable clamping surfaces of substantially goose neck form.

EDWARD H. RUGG.